(12) United States Patent
Miloslavsky

(10) Patent No.: US 12,190,393 B2
(45) Date of Patent: Jan. 7, 2025

(54) MICROSERVICE-BASED PLATFORM FOR MANAGEMENT OF INSURANCE POLICIES

(71) Applicant: EIS Software Ltd., Montenotte (IE)

(72) Inventor: Alec Miloslavsky, Montenotte (IE)

(73) Assignee: EIS SOFTWARE LTD., Montenotte (IE)

( * ) Notice: Subject to any disclaimer, the term of this patent is extended or adjusted under 35 U.S.C. 154(b) by 0 days.

(21) Appl. No.: 18/536,196

(22) Filed: Dec. 11, 2023

(65) Prior Publication Data

US 2024/0112276 A1 Apr. 4, 2024

Related U.S. Application Data

(63) Continuation of application No. 18/360,673, filed on Jul. 27, 2023, now abandoned.

(60) Provisional application No. 63/392,618, filed on Jul. 27, 2022, provisional application No. 63/392,761, filed on Jul. 27, 2022.

(51) Int. Cl.
G06Q 40/08 (2012.01)

(52) U.S. Cl.
CPC .................. G06Q 40/08 (2013.01)

(58) Field of Classification Search
None
See application file for complete search history.

(56) References Cited

U.S. PATENT DOCUMENTS

| | | | |
|---|---|---|---|
| 8,775,221 B2 * | 7/2014 | Feldman | G06Q 40/08 705/36 R |
| 10,860,390 B2 | 12/2020 | Sukhomlinov et al. | |
| 2003/0204421 A1 * | 10/2003 | Houle | G06Q 10/10 707/999.107 |
| 2017/0193606 A1 * | 7/2017 | Thomas | G06Q 40/08 |
| 2019/0180379 A1 | 6/2019 | Nayak et al. | |
| 2020/0234327 A1 * | 7/2020 | Salloum | G06Q 40/08 |
| 2021/0124576 A1 | 4/2021 | Gungabeesoon et al. | |

* cited by examiner

Primary Examiner — Narayanswamy Subramanian
(74) Attorney, Agent, or Firm — Galvin Patent Law LLC; Brian R. Galvin

(57) ABSTRACT

A cloud-based insurance underwriting and management platform based on microservice technology which is easily customizable to each insurance provider's specific needs and scalable for any size insurance provider and any number of insureds. In an embodiment, the cloud-based platform comprises an external system interface comprised of application programming interfaces (APIs) through which insurers and insureds can access the features of platform, a plurality of microservices which provide the features and capabilities of platform, and one or more databases which store the customer information, policy information, and financial information required for the insurance provider to manage its underwriting and/or policy management.

3 Claims, 12 Drawing Sheets

MICROSERVICE-BASED PLATFORM FOR MANAGEMENT OF INSURANCE POLICIES

CROSS-REFERENCE TO RELATED APPLICATIONS

Priority is claimed in the application data sheet to the following patents or patent applications, each of which is expressly incorporated herein by reference in its entirety:
Ser. No. 18/360,673
63/392,618
63/392,761

BACKGROUND OF THE INVENTION

Field of the Art

The present invention is in the field of computerized data management systems, and more particularly to microservice-based computerized platforms for configuration and administration of life insurance policies.

Discussion of the State of the Art

Insurance policies are highly complex, containing many terms and conditions which address a multiplicity of potential risks and which require compliance with ever-increasing regulatory requirements. Creating and managing individual policies for large numbers of insureds is labor intensive, costly, and prone to error. While insurance underwriting and policy management platforms do exist, they are currently on-premise, proprietary, and inflexible. Life insurance policies are particularly complex, having a multitude of possible options and requiring not only administration of premiums and payouts, but management of financial portfolios and annuity payments. Adding to the complexity is the fact that existing software for insurance underwriting and policy management platforms are divided into individual life insurance and group life insurance as the requirements for both are different and software has evolved separately for each type. No software allows for consolidated management of both individual life insurance and group life insurance. Further, there are no existing underwriting and policy management platforms for worksite insurance.

What is needed is cloud-based insurance underwriting and management platform which is easily customizable to each insurance provider's specific needs, capable of providing consolidated underwriting and management of all types of insurance, and scalable for any size insurance provider and any number of insureds.

SUMMARY OF THE INVENTION

Accordingly, the inventor has conceived and reduced to practice, a cloud-based insurance underwriting and management platform based on microservice technology which is easily customizable to each insurance provider's specific needs and scalable for any size insurance provider and any number of insureds. In an embodiment, the cloud-based platform comprises an external system interface comprised of application programming interfaces (APIs) through which insurers and insureds can access the features of platform, a plurality of microservices which provide the features and capabilities of platform, and one or more databases which store the customer information, policy information, and financial information required for the insurance provider to manage its underwriting and/or policy management.

According to a preferred embodiment, a cloud-based system for insurance product management is disclosed, comprising: a computing device comprising a memory, a processor, and a non-volatile data storage device; an insurance product template database stored on the non-volatile data storage device, the product template database comprising definitions for a plurality of pre-defined life insurance products; an external system interface operating on the computing device comprising a plurality of application programming interfaces (APIs) which provide access to the functionality of a plurality of foundational microservices via API calls and to a plurality of product-specific microservices via API calls; the plurality of foundational microservices accessible via the APIs of external system interface each of which implements functionality common to all of a plurality of insurance products supported by the cloud-based system; the plurality of product-specific microservices accessible via the APIs of external system interface wherein each product-specific microservice implements product specific capabilities for one or more of the plurality of pre-defined life insurance products; and a product factory module for defining new life insurance products based on the plurality of templates stored in the product template database, the definitions of which automatically assign a first set of foundational microservices of the plurality of foundational microservices and a first set of product-specific microservices of the plurality of product-specific microservices to each newly-defined life insurance product; wherein when a first life insurance product is defined using the product factory, management and administration of the first life insurance policy is automated by receipt of API calls via external system interface to the first set of foundational microservices and the first set of product-specific microservices.

According to an aspect of an embodiment, the plurality of foundational microservices implement functionality common to the plurality of insurance products which includes term life insurance products and permanent life insurance products.

According to an aspect of an embodiment, the plurality of product-specific microservices implements product specific capabilities for permanent life insurance products comprising whole life insurance and universal life insurance.

According to an aspect of an embodiment, the insurance product template database further comprises a master policy comprising terms and conditions to be applied to a plurality of the pre-defined life insurance products; and the cloud-based system further comprises a policy cascading transactions module comprised of a plurality of cascading transaction microservices, wherein the policy cascading transactions module is configured to cascade any changes to the master policy to any of the pre-defined life insurance products which are dependent on the master policy.

According to an aspect of an embodiment, a conversion model comprising a plurality of conversion microservices is configured to transpose terms and conditions of group insurance policies terms onto equivalent terms of individual insurance policies and vice-versa, wherein a change made to the master policy is propagated to both dependent group insurance policies of the pre-defined life insurance products and dependent individual insurance policies of the pre-defined life insurance products by passing the changes through the conversion model.

BRIEF DESCRIPTION OF THE DRAWING FIGURES

DETAILED DESCRIPTION OF THE INVENTION

Figure 1:
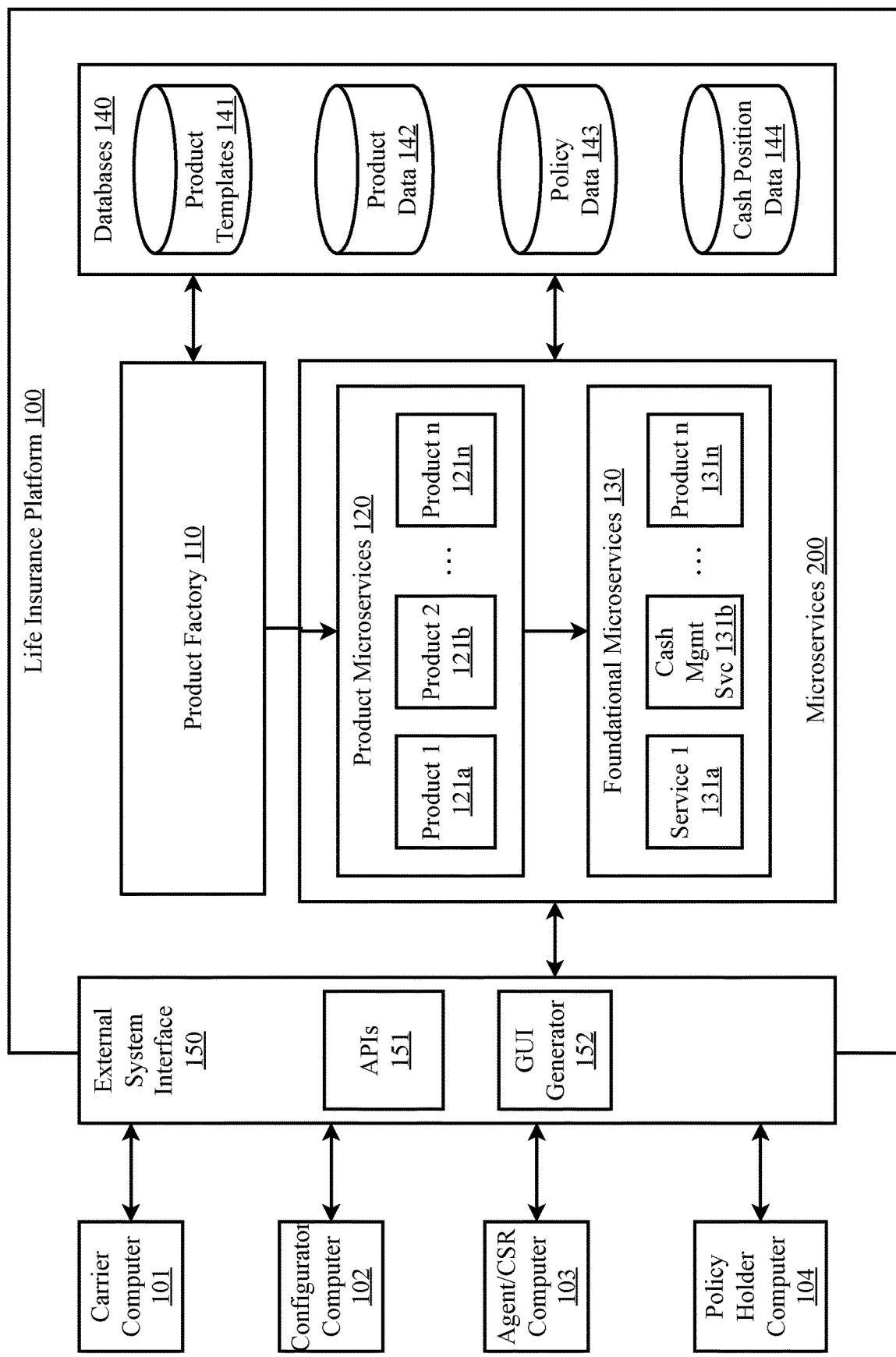
FIG. 1 is a block diagram of an exemplary system architecture for a platform for management of life insurance products.

The inventor has conceived, and reduced to practice, a cloud-based insurance underwriting and management platform based on microservice technology which is easily customizable to each insurance provider's specific needs and scalable for any size insurance provider and any number of insureds. In an embodiment, the cloud-based platform comprises an external system interface comprised of application programming interfaces (APIs) through which insurers and insureds can access the features of platform, a plurality of microservices which provide the features and capabilities of platform, and one or more databases which store the customer information, policy information, and financial information required for the insurance provider to manage its underwriting and/or policy management.

Insurance policies are highly complex, containing many terms and conditions which address a multiplicity of potential risks and which require compliance with ever-increasing regulatory requirements. Creating and managing individual policies for large numbers of insureds is labor intensive, costly, and prone to error. While insurance underwriting and policy management platforms do exist, they are currently on-premise, proprietary, and inflexible. Life insurance policies are particularly complex, having a multitude of possible options and requiring not only administration of premiums and payouts, but management of financial portfolios and annuity payments. Adding to the complexity is the fact that existing software for insurance underwriting and policy management platforms are divided into individual life insurance and group life insurance as the requirements for both are different and software has evolved separately for each type. No software allows for consolidated management of both individual life insurance and group life insurance. Further, there are no existing underwriting and policy management platforms for worksite insurance, which is individual life insurance, but has certain aspects of group life insurance such as deduction of premiums from work paycheck and limited employer administrative and branding support.

As platforms for underwriting and management of the different types of life insurance (individual life versus group life) have developed separately and there is currently no platform that handles the hybrid worksite life insurance, no platform is available for consolidated underwriting and management of the different types of life insurance, despite the fact that there are commonalities among the various products offered under each different type of life insurance. This means that separate systems must be used to offer different types of life insurance even to the same client or clients, increasing the administrative work involved, and increasing the chance of gaps in coverage between policies for the same client managed on different platforms and other administrative errors.

Microservice-based platform described herein solves these problems by providing a more robust and flexible architecture for consolidated management of different types of insurance products offered by an insurer (e.g., individual life, group life, and worksite life) using the business policies, rules, and terms and conditions that the insurer has with each employer (for group policies), individuals (for individual policies), and employer/individual combinations (for hybrid worksite life). Using a micro-service architecture allows for unlimited customization and scalability, and allows application of policies, rules, and terms and conditions not only within product lines within a given type of insurance, but also for similar or related product lines across types of insurance. Customized product terms and conditions can be defined at a master contract level wherein those terms and conditions may be "inherited" by all similar or related products and policies that are written based on that master contract, even across different product lines or different types of insurance. Thus, product terms and conditions may be defined at macro level and can be further adjusted at individual level simply by modifying or making exceptions to the inherited terms of the master contract. As an example, let's assume that an insurer wishes to make a blanket exclusion across the company for injury or death due to a novel communicable disease in all new or renewed group life policies. That exclusion can be entered into a master-level microservice which propagates through to all group life policies as they are issued or renewed.

Further, platform allows for the definition of transformation or conversion models as microservices which can be accessed via application programming interfaces (API). Calling the APIs (either for specific policy terms or entire policies, depending on the configuration of microservice) transposes group policy terms onto their individual policy analogues and vice-versa. As a simple example, if the above-mentioned master exclusion in group policies for injury or death due to a novel communicable disease defines the term "insured" as "an employee of insured company," transmitting that definition to the API of a transformation microservice may return a definition of "insured" of "the individual insured under this policy," which may then be written into the appropriate location in the definitions section of the individual policy. The reverse process can also be defined, wherein term and conditions defined for individual policies may be converted via API calls to microservices into appropriate terms and conditions for group policies or worksite policies.

This microservice transformation or conversion model allows for consolidated underwriting and management of policies across disparate product lines and across different types of insurance which heretofore have been managed by different departments or groups within insurers. While the structure of policies (specific underwritten contracts for a particular insurance product for specific insured parties) may be different between group, worksite, and individual policies, they can all be managed as collections of common "concepts" by microservice transformation or conversion models described above. Not only can changes made at a master level propagate down through product lines, the same changes can propagate across to different products lines or types of insurance by the microservice transformation or conversion models. Thus, if a certain change needs to be made across the company, it can be done for one product line or type of policy and automatically applied to other product lines or types of policies.

A microservice feature, once defined, can be externalized to provide functionality to any entity (e.g., customer service representatives, employers, employees, insurance brokers) and to any process (e.g., transformations or conversions, propagation of master level definitions or constraints to lower-tier policies, automated quotes, etc.) which requires that functionality simply by providing the necessary API call protocol for that microservice. Microservices can be linked together to provide more complex functionality by a click-and-drag process in a graphical user interface with little or no programming knowledge required.

During the life cycle of an insurance product, platform receives transaction requests from an agency system operated by an agency, such as a request to provide a quote for a new policy, open a new policy, terminate a policy, provide an estimate of current cash/borrowing/death-benefit values associated with the policy, post a premium payment, post a withdrawal of funds, post borrowing of funds, and the like. Platform described herein includes a policy database and a cash position database. The policy database stores information regarding terms of the policies available for each of a plurality of agencies to sell and each policy that has been sold by each agency to an insured person and/or group that is managed using platform. For each such policy, the policy database includes policy identification data that includes identifying information about an insured person (name, address, social security number, etc.) associated with the policy, agency information, the type of the policy (whole life or universal life), sales channel (individual or group), premium information (if applicable), and the like.

As noted above, platform also includes a cash position database that stores, for each policy sold by each agency, information regarding the premiums paid, investment earnings, interest earnings, cash-value available for withdrawal, cash-value available for borrowing, and death-benefit value. The cash position database also stores transactions history data for each policy that includes all transactions associated with the policy that have been posted (i.e., received and completed) by platform since inception of the policy.

Platform includes a graphical user interface (GUI) generator that causes the agency system to generate a GUI on a computer associated with the agency system. The GUI allows a user of an agency to enter certain types of transaction requests, such as request for a quote for a new policy, open a new policy, request an amount of funds available for withdrawal, an amount of funds available to borrow, and/or an amount of a death-benefit value. Other transaction requests may be generated automatically by the agency system without a GUI and transmitted directly to platform with the via an application programming interface (API).

Different GUIs may be generated on the agency system for different types of policies managed by platform. For example, if the user wants to submit a request to open a new whole life policy for a group, the GUI provided to the user includes fields in which the user may submit information that is unique to a whole life group policy and will not include fields for information unique to a universal life policy or a whole life individual policy.

Similarly, the API may specify different sets of function calls for different types of policies.

The GUI and API provided to the agency system reflect the differences between whole life and universal life insurance policy terms, such as when and how often premiums are paid, how the value of the policy grows, how any withdrawable and/or borrowable fund(s) are determined, how a death benefit associated with the policy is calculated and the like, and differences between group and individual policies. For example, the GUI associated with a group policy may allow the user to enter and modify information regarding an entity (e.g., an employer) associated with the group and the members of the group (e.g., employees) who are covered by the policy.

A command handler receives a policy-specific request from the agency system (either via the GUI or API) that is associated with a particular type of policy and in response generates and sends one or more policy-generic request(s) to a policy manager and/or a cash value manager. The policy-generic request generated by the command handler is agnostic whether the policy is individual whole life policy, a group whole life policy, an individual universal life policy, or a group universal life insurance policy.

For example, if the command handler receives a policy-specific request, e.g., OpenNewGroupWholeLifePolicy( ) with parameters (included in the foregoing parentheses) that identify a group, members of the group, monthly premium amount, etc., the command handler generates and issues a request, e.g., OpenNewPolicy( ) to the policy manager to create a new entry in the policy database for each member of the group identified in the OpenNewGroupWholeLifePolicy( ) request. The OpenNewGroupWholeLifePolicy( ) request identifies the member and group, and the policy manager creates an entry for the member in the policy database.

Similarly, if the command handler receives a policy-specific request OpenNewIndWholeLifePolicy( ) request with parameters of an individual owner of the policy and no parameters associated with group information, the command handler then generates another OpenNewPolicy( ) request to the policy manager. In this case, the OpenNewPolicy( ) request identifies the individual owner of the policy and sets the parameters associated with group identifiers to predetermined values.

Policy-specific requests received by the command handler that involve the value of a policy such as posting premium payments, requests for withdrawals, requests for amounts available for withdrawal or to borrow, amount of the death benefit, and the like are translated into policy-generic requests and sent to a cash value manager. For example, if the command handler receives a policy-specific request PostPremiumPaymentGroupWholeLife( ) with parameters that identify a group associated with a whole life policy and a premium amount, the command handler generates a policy-generic PostPremium( ) request to the cash value manager for each member of the group. Each PostPremium( ) request identifies the member of the group and the premium amount.

Similarly, if the command handler receives an API call PostIndUnivPremium( ) to post a non-recurring premium payment associated with an individual's universal life policy, the command handler generates and sends the PostPremium( ) request as described above to the cash value manager that identifies the individual and the amount of the premium payment as specified by parameters of the PostIndUnivPremium( ) request.

In some cases, after processing the policy-generic request, the policy manager or cash manager transmits an acknowledgement of such processing and/or a result generated by such processing to the command handler, which in turn transmits such acknowledgment and/or result to the agency system.

The agency system may submit a policy-specific request to the EIS platform to simulate certain events to determine the effect of such events on cash balances associated with a policy. For example, the agency system may submit a request to simulate the effect on the death-benefit and cash value of particular individual's universal life insurance policy if an additional premium of a particular amount is submitted. The command handler generates and submits a policy-generic request to the cash value manager. The cash value manager applies rules associated with the effects of premium payments to simulate the event and returns the results to the agency system.

In some embodiments, the agency system may submit a policy-specific out-of-sequence (OOS) request. An example of such an OOS request is if the agency received a premium payment on a first date, the agency did not post the payment to platform until a second date, and additional transactions (such as a dividend payment, a premium payment, a withdrawal, an investment payment, etc.) were posted between the first date and the second date that caused a change in the values in the cash and death-benefits associated with the policy that did not take the premium payment into account. In this case, the command handler generates and sends a policy-generic out-of-sequence (OOS) request to the cash value manager that includes the first date when the request should have been posted. In response, the cash value manager retrieves information regarding the additional transactions that were posted between the first date and the second date from the cash position database, determines the value of the policy on the first date, simulates submission of the out-of-sequence request as if such request had been submitted on the first date, and simulates the positing of the additional transactions to confirm that the OOS request does not result in an error condition such as, for example, the policy not being sufficiently funded at any time between the first and second dates.

If no error occurs during the simulation of the OOS request, the cash value manager determines the value of the policy as of the first date, posts the OOS request to the policy, and posts all transactions between the first date and the second date so that the cash values of the policy are determined in accordance with the premium payment having been posted on the first date.

Term life insurance products and permanent life insurance products are different types of life insurance products. Further, whole life insurance products and universal life insurance products are different types of permanent life insurance products. A graphical user interface (GUI) for an insurance platform is described herein that allows an agent or customer service representative (CSR) associated with a carrier to provide information to platform regarding a prospective purchaser of a policy. In response, platform generates and displays on the GUI a quote for the policy. If the quote is acceptable to the purchaser of the policy, the agent/CSR can use the GUI to indicate purchase of the policy on behalf of the purchaser. More particularly, the system described herein utilizes a carrier or other user graphical user interface (GUI) and an agent/CSR GUI. The carrier or other user GUI allows definition of a product to be offered or which is already offered by an insurance carrier. The agent/CSR GUI facilitates the sale of one or more insurance policies according to the product(s) defined by the carrier. It should be noted that one or both of the GUIs disclosed herein may or may not be actually utilized inasmuch as APIs may be specified that may guide the functions of setting up a product and selling policies according to the product(s) without the need to interact with a GUI. Further, while the GUIs described herein are described in connection with insurance products, it should be noted that the GUIs are not limited to use with such products, it being understood that one or both GUIs may instead be used to define and facilitate the sale of other products.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTION OF THE DRAWING FIGURES

FIG. 1 is a block diagram of an exemplary system architecture for a platform for management of life insurance products. Microservice-based platform described herein solves consolidated management of different types of insurance products offered by an insurer (e.g., individual life, group life, and worksite life) by providing a more robust and flexible architecture which allows for consolidation of, and cross-type use of, the business policies, rules, and terms and conditions that the insurer has with each employer (for group policies), individuals (for individual policies), and employer/individual combinations (for hybrid worksite life). Using a micro-service architecture allows for unlimited customization and scalability, and allows application of policies, rules, and terms and conditions not only within product lines within a given type of insurance, but also for similar or related product lines across types of insurance. Customized product terms and conditions can be defined at a master contract level wherein those terms and conditions may be "inherited" by all similar or related products and policies that are written based on that master contract, even across different product lines or different types of insurance. Thus, product terms and conditions may be defined at macro level and can be further adjusted at individual level simply by modifying or making exceptions to the inherited terms of the master contract. As an example, let's assume that an insurer wishes to make a blanket exclusion across the company for injury or death due to a novel communicable disease in all new or renewed group life policies. That exclusion can be entered into a master-level microservice which propagates through to all group life policies as they are issued or renewed.

Further, platform allows for the definition of transformation or conversion models as microservices which can be accessed via application programming interfaces (API). Calling the APIs (either for specific policy terms or entire policies, depending on the configuration of microservice) transposes group policy terms onto their individual policy analogues and vice-versa. As a simple example, if the above-mentioned master exclusion in group policies for injury or death due to a novel communicable disease defines the term "insured" as "an employee of insured company," transmitting that definition to the API of a transformation microservice may return a definition of "insured" of "the individual insured under this policy," which may then be written into the appropriate location in the definitions section of the individual policy. The reverse process can also be defined, wherein term and conditions defined for individual policies may be converted via API calls to microservices into appropriate terms and conditions for group policies or worksite policies.

This microservice transformation or conversion model allows for consolidated underwriting and management of policies across disparate product lines and across different types of insurance which heretofore have been managed by different departments or groups within insurers. While the structure of policies (specific underwritten contracts for a particular insurance product for specific insured parties) may be different between group, worksite, and individual policies, they can all be managed as collections of common "concepts" by microservice transformation or conversion models described above. Not only can changes made at a master level propagate down through product lines, the same changes can propagate across to different products lines or types of insurance by the microservice transformation or conversion models. Thus, if a certain change needs to be made across the company, it can be done for one product line or type of policy and automatically applied to other product lines or types of policies.

A microservice feature, once defined, can be externalized to provide functionality to any entity (e.g., customer service representatives, employers, employees, insurance brokers) and to any process (e.g., transformations or conversions, propagation of master level definitions or constraints to lower-tier policies, automated quotes, etc.) which requires that functionality simply by providing the necessary API call protocol for that microservice. Microservices can be linked together to provide more complex functionality by a click-and-drag process in a graphical user interface with little or no programming knowledge required.

Figure 3:
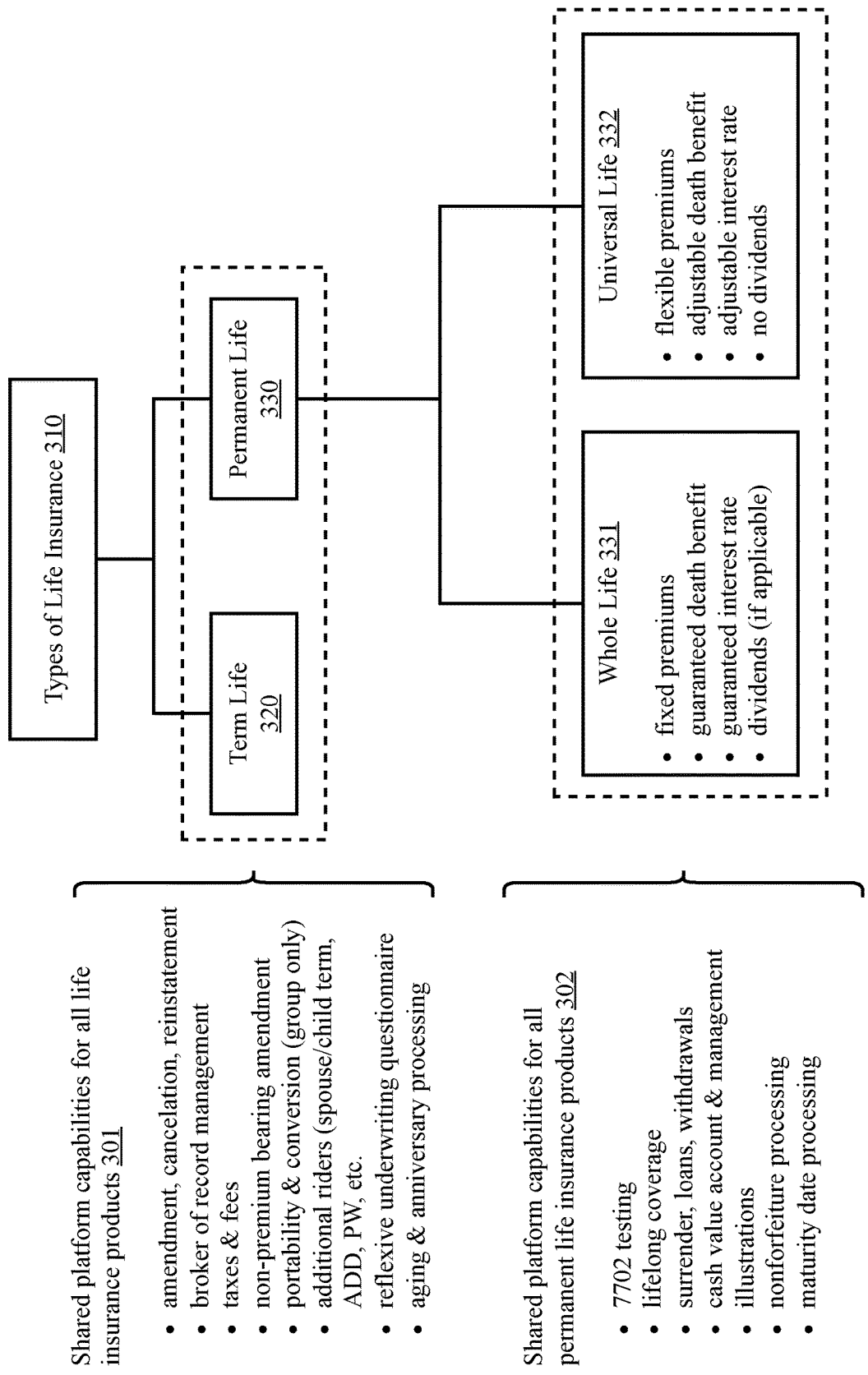
FIG. 3 is a diagram illustrating features and capabilities of a platform for management of life insurance products for different types of life insurance products.

In this exemplary architecture, platform 100 allows creation and administration of the different types of life insurance products shown in FIG. 3. Platform 100 includes an external system interface 150 that facilitates communications between platform 100 and systems external to platform 100 such as a carrier computer 101, a configurator computer 102, an agent computer 103, and a policy holder computer 104. External system interface further comprises one or more application programming interfaces (APIs) 151 and a graphical user interface (GUI) generator 152.

It should be apparent to one who has ordinary skill in the art that platform 100 may communicate with additional external systems via external system interface 150 such as systems associated with brokerages, taxation and regulatory systems, and the like. Such additional external systems and communications therewith by platform 100 are not discussed herein for sake of clarity.

In some cases, if one of computers 101-104 is operated by an operator, external system interface 150 generates a GUI on such computer to display one or more screens in which the operator may input information and transmits such information to other components of platform 100, as described below. In addition, external system interface 150 provides an API that one or more of computer(s) 101-104 may use to provide information and/or commands to platform 100 without requiring a GUI.

Platform 100 also includes one or more foundational microservices 130, 131a-n that implement the capabilities shown in box 301 of FIG. 3 that are common to all products supported by platform 100, as shown in 121a-n. One of these foundational services may be a cash management service 131b. In addition, platform 100 includes one or more product specific microservices 120, wherein each microservice 120 implements the product specific capabilities for one of a plurality of products 121a-n shown in boxes 302-332 of FIG. 3. In addition, platform includes a product factory 110 that allows the policy configurator to define a new life insurance product and a plurality of templates 141 on which the new life insurance product may be based. In this way, platform 100 comprises microservices 200 can be combined in various ways to customize functionality of platform 100 for particular insurers, particular products, particular insureds, or any combination of these aspects. As microservices 200 are cloud-based and the functionality of each microservice 200 is accessible remotely via API calls, there is no theoretical limit on the customizability or scalability of platform 100.

Platform 100 also includes one or more database(s) 140 in which information regarding life insurance products, policies, cash positions associated with policies, and the like may be recorded such as a product template database 141, a product data database 142, a policy data database 143, and a cash position data database 144. The database(s) 140 include policy identification data that includes identifying and characteristic information about an insured person (name, address, social security number, etc.) associated with a policy, carrier and agency information, the type of the policy (whole life or universal life), sales channel (individual or group), premium information (if applicable), a transaction history associated with the policy, and the like.

In addition, the database(s) 140 store, for each policy sold by each carrier, information regarding the premiums paid, investment earnings, interest earnings, cash-value available for withdrawal, cash-value available for borrowing, and death-benefit value. The cash position database also stores transactions history data for each policy that includes all transactions associated with the policy that have been posted (i.e., received and completed) by platform since inception of the policy.

Figure 2:
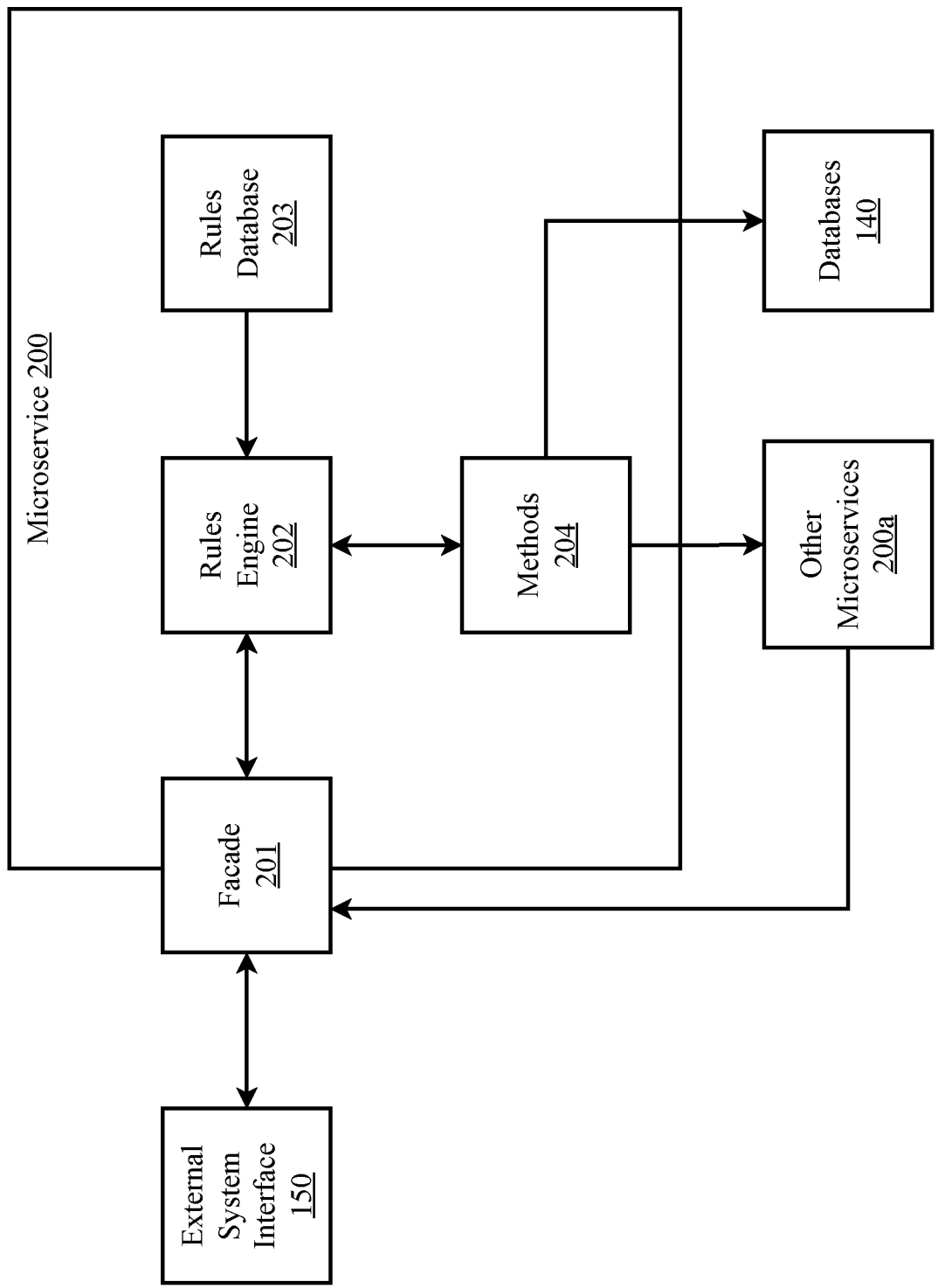
FIG. 2 is a block diagram of an exemplary microservice aspect of a platform for management of life insurance products.

FIG. 2 is a block diagram of an exemplary microservice aspect of a platform for management of life insurance products. As discussed above, foundational and product specific capabilities provided by platform are implemented as microservices. Referring to FIG. 2, each microservice 200 (which may be a foundational microservice 130 or a product specific microservice 120) is a containerized application that includes a façade or interface 201, a rules engine 202, one or more predefined rules 203, and one or methods 204. Façade 201 provides an API used by external system interface 150 or another microservice 200a to send one or more commands and associated parameters to microservice 200.

When microservice 200 receives a command, rules engine 202 of microservice 200 selects one or more rules 203 based on the command and parameters associated with the command, and produces an output and/or causes an action to be undertaken as specified by the one or more rules. In some cases, a selected rule may specify an output value to provide to the component 150 or 130 that issued the command. For example, if microservice 200 receives a command to provide a premium quote for a policy for a prospective policy holder, a rule 203 associated with the quote command may generate an output value that is an estimate of a premium based on characteristics (e.g., demographics, habits, etc.) of the potential policy holder, wherein such characteristics are supplied as parameters to the quote request command.

In other cases, the selected rule 203 may specify one or more of executing a method 204, sending a further command to a foundational microservice 130, retrieving or storing information in one of the database(s) 140, causing a transition in the state associated with the policy (described below), and/or applying another rule 203. In such cases, the selected rule may specify how microservice 200 should aggregate the outputs of one or more of these operations to produce an output provided component 150 or 130 that issued the command In some cases, the output may simply be an acknowledgement that the command was processed.

To define a new product and create a product specific microservice 120 associated with the new product, the product configurator uses configurator computer 102 and product factory 110 to specify values of the characteristics shown in boxes 302, 331, and 332 associated with the new product using product factory 110. Further, by specifying such values, the configurator can create a new term, whole life, or universal life insurance product and the product specific microservice 120 to administer such product.

The following table shows how different types of policies may be configured by setting values of such characteristics:

|  | Value | |
| --- | --- | --- |
| Option | True | False |
| Death Benefit | Life Insurance | Annuity Product |
| Cash Value | Whole/Universal | Term |
| Flexible Billing | Universal | Whole |
| Lifelong Coverage | Whole/Universal | Term |

For example, according to the table above, if the value of the death benefit option is "true," a life insurance product is configured and if such value is "false," an annuity product is configured.

As shown in FIG. 3, term life insurance products and permanent life insurance products are different types of life insurance products. Further, whole life insurance products and universal life insurance products are different types of permanent life insurance products. A life insurance platform is described below that allows a product configurator associated with insurance carrier (typically a representative of an insurance carrier) to easily configure a variety of different types of life insurance products and efficiently manage policies issued for such different products. After the product has been configured, an agent (or customer service representative ("CSR")) associated with the carrier may use platform to quote, issue, and manage a policy based on the product to a policy holder.

Platform separates implementations of operations that are common to all life insurance products from those that are specific to a particular type of life insurance product. In this manner, a new life insurance product may be easily configured by identifying the operations/features that are unique to the new life insurance product and implementing those new features. Further, implementations of operations associated with a particular life insurance product may be modified without affecting implementations of operations associated with other life insurance products supported by platform or that are common to all life insurance products.

FIG. 3 is a diagram illustrating features and capabilities of a platform for management of life insurance products for different types of life insurance products. On the right side of the diagram, a tree of the most common types of life insurance is shown starting with the root 310, proceeding to the primary division of life insurance into two types, term life insurance 320 and permanent life insurance 330. Term life insurance 320 is provided only for the policy term and expires when the policy term expires. Permanent life insurance 330 remains valid for the lifetime of the individual, and acts much like an investment vehicle in which the insured pays premiums during the policy period which then generate interest and pay out the principal and interest on the death of the insured. Permanent life insurance 330 may be further divided into two major categories: whole life insurance 331 and universal life insurance 332, with whole life 331 offering guaranteed rates and payouts but less flexibility, and universal life 332 offering more flexibility but no guaranteed rates or payouts.

Referring to FIG. 3, box 301 shows foundational capabilities implemented by platform for all life insurance products including, but not limited amendment, cancelation, reinstatement; broker of record management; taxes & fees; non-premium bearing amendment; portability & conversion (group only); additional riders (spouse/child term, ADD, PW, etc.); reflexive underwriting questionnaire; and aging & anniversary processing. Each of these features may be implemented by a microservice or combination of microservices as described above, and master policy terms and conditions may be created which cascade these features down to products and/or propagate these features across insurance types.

Box 302 shows features that all permanent life insurance products share and are implemented to support policies issued for such products, including but not limited to: 7702 testing; lifelong coverage; surrender, loans, withdrawals; cash value account & management; illustrations; nonforfeiture processing; and maturity date processing. Each of these features may be implemented by a microservice or combination of microservices as described above, and master policy terms and conditions may be created which cascade these features down to products and/or propagate these features across insurance types.

Further, boxes 331 and 332 shows features that distinguish whole life insurance products from universal life insurance products, respectively, namely that whole life 331 offers guaranteed rates and payouts but less flexibility, and universal life 332 offers more flexibility but no guaranteed rates or payouts.

Figure 4:
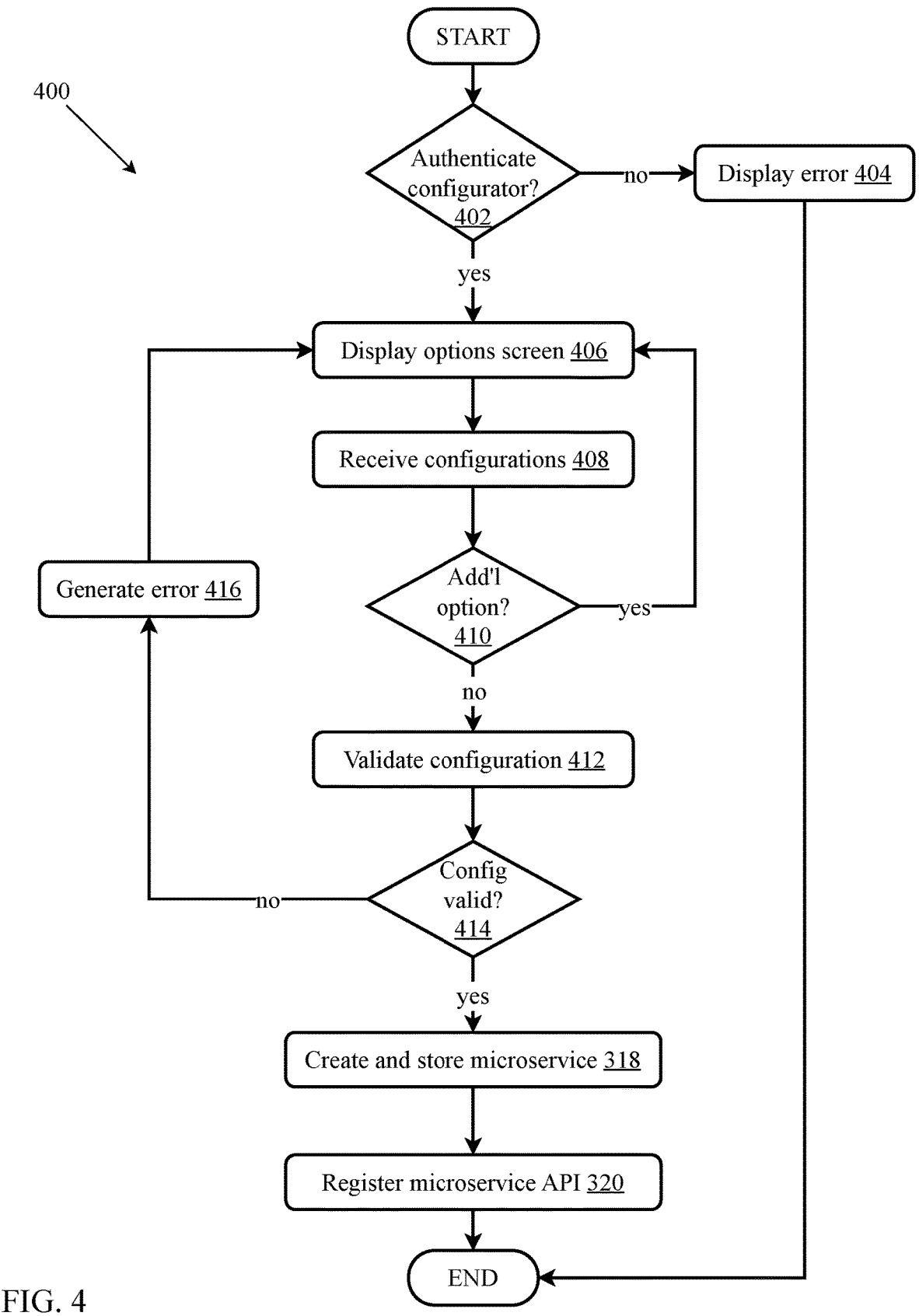
FIG. 4 is a flowchart illustrating an exemplary configuration of a microservice for a new feature or capability of a platform for management of life insurance products microservice may be configured.

FIG. 4 is a flowchart illustrating an exemplary configuration of a microservice for a new feature or capability of a platform for management of life insurance products microservice may be configured. FIG. 4 shows a flowchart 400 that illustrates creation of the new product and microservice associated therewith. Referring to FIGS. 2-4, at step 402, external system interface 150 validates authentication credentials of the policy configurator received from configurator computer 102 to confirm that the policy configurator is authorized to create a new product. If the policy configurator does not have sufficient authorization, external system interface displays an error message, at step 404, and exits.

If the policy configurator does have sufficient authorization, then at step 406 external system interface 150 loads product factory 110 and displays a screen (or form) of a GUI specified by product factory 110. Such screen allows the configurator to specify characteristics (or values of options) associated with the new product. At step 408 external system interface 150 receives from configurator computer 102 information entered into the GUI screen generated at step 406 and provides such information to product factory 110. At step 410, product factory 110 determines if additional options need to be specified to fully configure the new product. If so, product factory 110 returns to step 406 and directs external system interface 150 to display a further screen to acquire addition configuration information. Alternately, if product factory 110 determines that all necessary configuration information has been entered, product factory 110 proceeds to step 412.

Initial GUI screens generated by product factory 110 allow the product configurator to select one of the predefined product templates 141 on which the new product is based or to indicate that the product configurator wishes to specify all of the characteristics associated with the new life insurance product (i.e., create the new product from scratch). Such screens may also allow the product configurator to provide an identifier, a date when a policy based on the product may be sold, regions where the product will be available, and the like. Subsequent screens allow the product configurator to specify a coverage period, whether and how dividend and/or interest payments are credited, whether the product has a death benefit associated therewith, and the like. The information entered by the product configurator in such screens determine whether the new life insurance product is a term life insurance product, a whole life insurance product, or a universal life insurance product, as described above.

Further, in some embodiments, each policy for a product administered by platform 100 has an initial (entry) state associated therewith. Product factory 110 allows the product configurator to specify an initial state and subsequent states, and events/actions that cause the state of the policy to transition from one state to another. Some states are associated with the quote generation process such as an initial quote has been provided for a policy, a binding quote has been provided for the policy, etc. After the policy has been issued, states for the policy may include the policy has been opened, has been extended, has been canceled, etc.

Product factory 110 also enables the product configurator to specify user interface elements that will be displayed to an operator of the agent/CSR computer 104 and/or policy holder computer 104 when such operator accesses information regarding a policy issued in accordance with the newly configured product, and what type of information may be modified by such operator using the user interface elements.

After the values of all of the options necessary to define the new product are entered at steps 406 through 410, product factory 110 at step 412 uses a rules engine thereof to validate the values of the options against predefined rules to confirm that the values are internally consistent and in accordance with accepted business practices. If at step 414, product factory 110 determines that the output of rules engine indicates that the configuration specified by the policy configurator is not valid, product factory 110 displays an error at step 416 that identifies the inconsistencies determined by the rules engine. Thereafter, product factory 110 returns to step 406 to and generates a screen to allow the product configurator to revise one or more values of options selected thereby.

Otherwise, at step 418 product factory 110 develops the rules 204 for the new product in accordance with the option values specified by the product configurator, selects predefined methods 204 necessary to implement administration of the new product, and defines the API calls (i.e., entry points) that may be used by external system interface 150 to send commands to the new product specific microservice 120 that will be associated with the new product. Thereafter, also at step 418, product factory 110 creates the product specific microservice 120 by creating an application container with the façade 201 that will accept the API calls, rules engine 202, the rules 204, and the methods 204.

At step 420, product factory 110 registers the new microservice with a container execution agent so that microservice is loaded and available for execution as needed and registers the API calls supported by the façade 201 with external system interface 150 and/or a messaging application (not shown) that facilitates communication among microservices 140 and 120.

After a product has been defined and a product specific microservice 140 associated with the product is created and registered as described above, external system interface 150 generates screens for the new product on the agent computer 104 that allow an agent or CSR operating such computer to request for the new product a quote for a policy, issue a policy, manage changes to existing policies, and the like.

Figure 5:
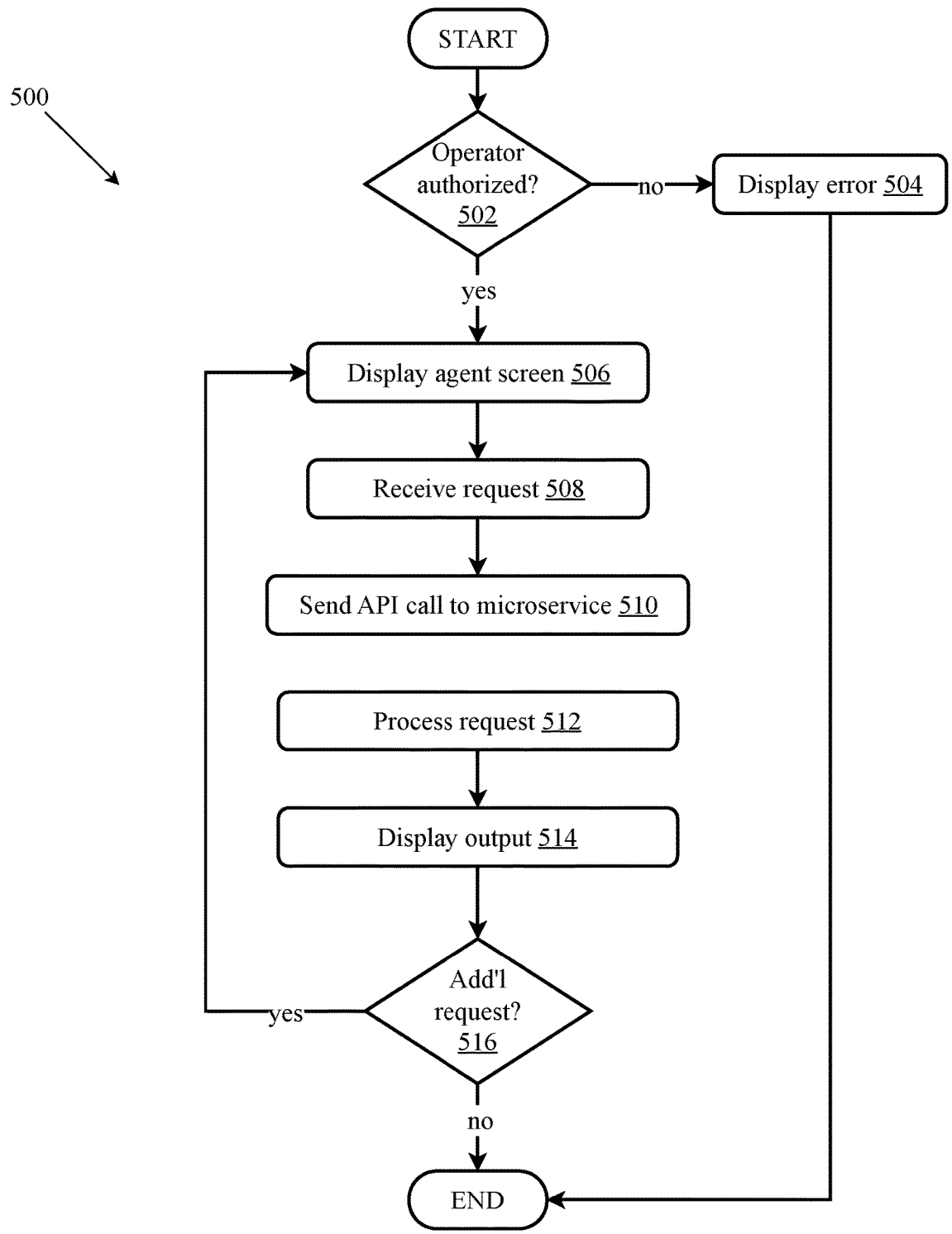
FIG. 5 is a flowchart illustrating exemplary processing of a request associated with a life insurance product using a microservice.

FIG. 5 is a flowchart illustrating exemplary processing of a request associated with a life insurance product using a microservice. FIG. 5 shows a flowchart 500 of steps undertaken by platform 100 to process requests associated with the products supported thereby.

At step 502 external system interface 150 authenticates the credentials of the operator of the agent/CSR computer 103 at step 502 to confirm the user of such computer is authorized to use platform 100. If the operator is not authorized to access platform 100, external system interface 150 displays an error at step 505 and exits.

Otherwise, at step 506 external system interface 150 displays a GUI screen to allow the operator of the agent/CSR computer 103 to specify a command associated with the product.

At step 508, the external system 150 receives the request and confirms parameters associated with the request have been specified. At step 510, external system interface 150 generates and sends an API call to either the product specific microservice 130 or one of the foundational microservices 120.

At step 512 microservice 130 or 120 that receives the call at step 510 processes the request, updates the database(s) 150 as necessary, and develops and provides an output to external system interface 150. At step 515 external system interface 150 displays the output on a display of the agent/CSR computer 103 and, at step 516, determines if the operator of such computer has an additional request. If so, platform 100 proceeds to step 506. Otherwise, platform 100 terminates the session with the agent/CSR computer 103.

It should be apparent to one of ordinary skill in the art that a policy holder operating a policy holder computer 105 may also access certain functions provided by platform 100 depending on the authorization provided to such policy holder. Further, it should be apparent to one of ordinary skill in the art that some foundational functions specified as provided by one or more microservice(s) may be implemented by one or more monolithic application of platform 100 instead of a microservice 120.

Referring once again to FIG. 1, one of the foundational microservices 120 of platform 100 is a cash value management microservice 131b. Although described below as a microservice, as noted above, the cash value management microservice 250 may be implemented in some embodiments of platform 100 as a monolithic application.

The cash value management microservice 131b handles processing commands that cause a change in cash position information (or cash balance) associated with a policy associated with, for example, a premium payment, a loan, a withdrawal, an interest/dividend payment, and the like.

For example, the cash value management microservice 131b may receive a command to post a payment for a particular policy. In response, the cash value management microservice 131b updates records in one or more database(s) 150 in accordance with the command and predefined business rules.

In some embodiments, the cash value management microservice 131b may receive from the carrier computer 101 or the agent/CSR computer 103 a request to simulate an event to determine the effect of such event on cash balances associated with a particular policy. For example, computer 101, 103 may submit a request to simulate the effect on the death-benefit and cash value of particular individual's universal life insurance policy if an additional premium of a particular amount is submitted. The cash value management microservice 131b applies rules associated with the effects of premium payments to simulate the event and returns the results, via external system interface 150, to computer 101 or 103 that generated the request. Note, that in such situations, the cash value management microservice 131b does not modify any of the cash position information in the database(s) 150.

In some embodiments, computer 101 or 103 may submit a policy-specific out-of-sequence (OOS) request. An example of such an OOS request is if the carrier or agent received a premium payment on a first date, the producer did not post the payment to platform 100 until a second date, and additional transactions (such as a dividend payment, a premium payment, a withdrawal, an investment payment, etc.) were posted between the first date and the second date that caused a change in the values in the cash and death-benefits associated with the policy that did not take the premium payment into account.

Figure 6:
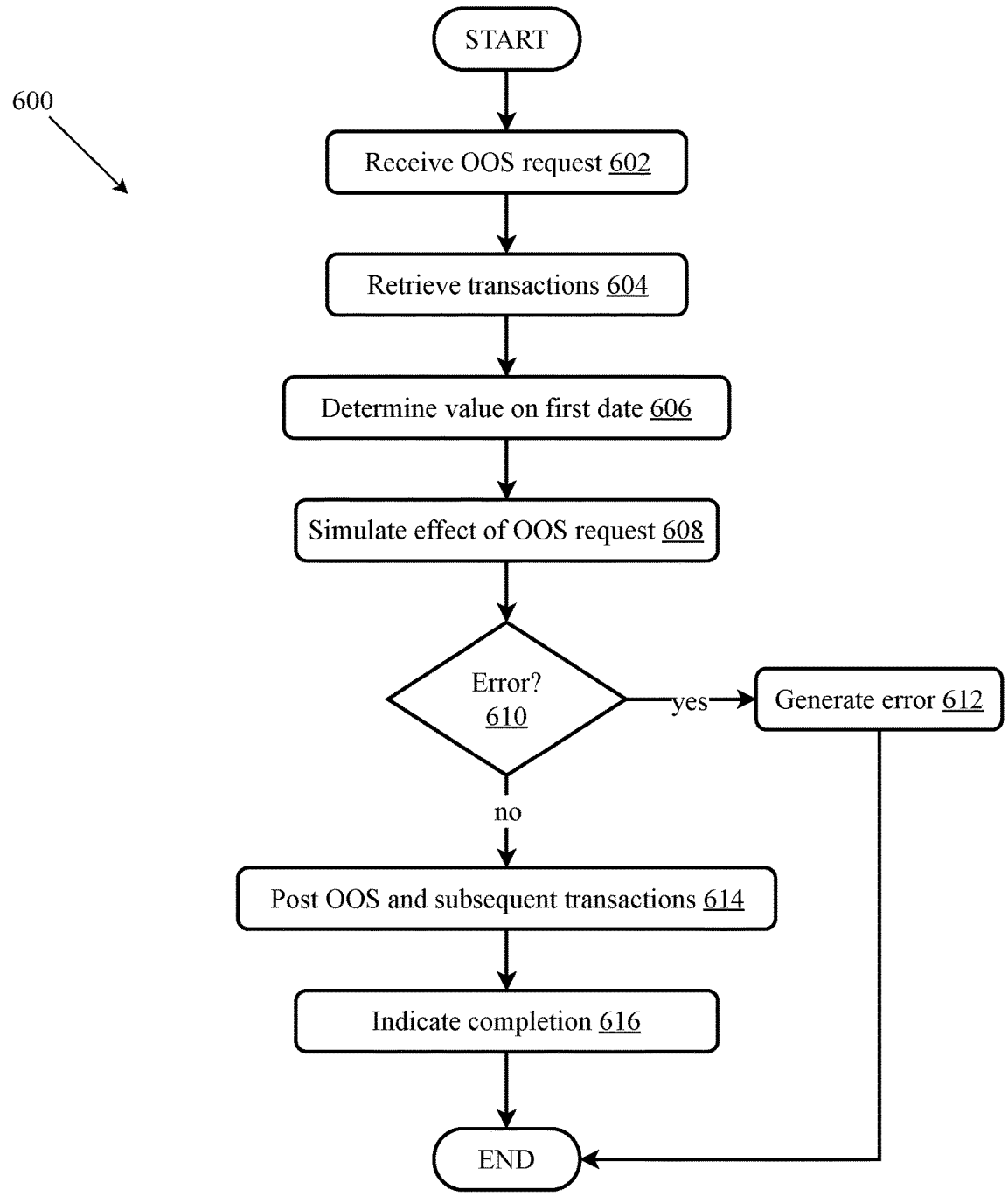
FIG. 6 is flowchart illustrating an exemplary process for cash value management using a platform for management of life insurance products.

FIG. 6 is flowchart illustrating an exemplary process for cash value management using a platform for management of life insurance products. FIG. 6 shows a flowchart 500 of processing undertaken by the cash value management microservice 131b to process such an out-of-sequence (OOS) request.

Referring to FIG. 6, at step 602 the cash value management microservice 131b receives via the façade 201 thereof a request to process the OOS request. In response, at step 604 the cash value management microservice 131b retrieves from the database(s) 140 information regarding the additional transactions that were posted between the first date and the second date. At step 606, the cash value management microservice 131b determines a value of the policy on the first date. At step 608, the cash value management microservice 131b simulates submission of the OOS request as if such request had been submitted on the first date and simulates subsequent positing of the additional transactions. At step 610, the cash value management microservice confirms that the simulation undertaken at step 608 does not result in an error condition such as, for example, the policy not being sufficiently funded at any time between the first and second dates. If the simulation generates an error condition, at step 612 the cash value management microservice 131b sends an indication to computer 101 or 103 that the request cannot be processed and terminates processing of the OOS request.

If no error condition occurs during the simulation of the OOS request, then at step 614 the cash value management microservice 131b determines the value of the policy as of the first date, posts the OOS request to the policy, and posts all transactions between the first date and the second date so that the cash values of the policy are determined in accordance with the premium payment having been posted on the first date. Thereafter, at step 616 the cash value management microservice 131b sends an indication to computer 101 or 103 that generated the OOS request that the request was processed without error.

Figure 7:
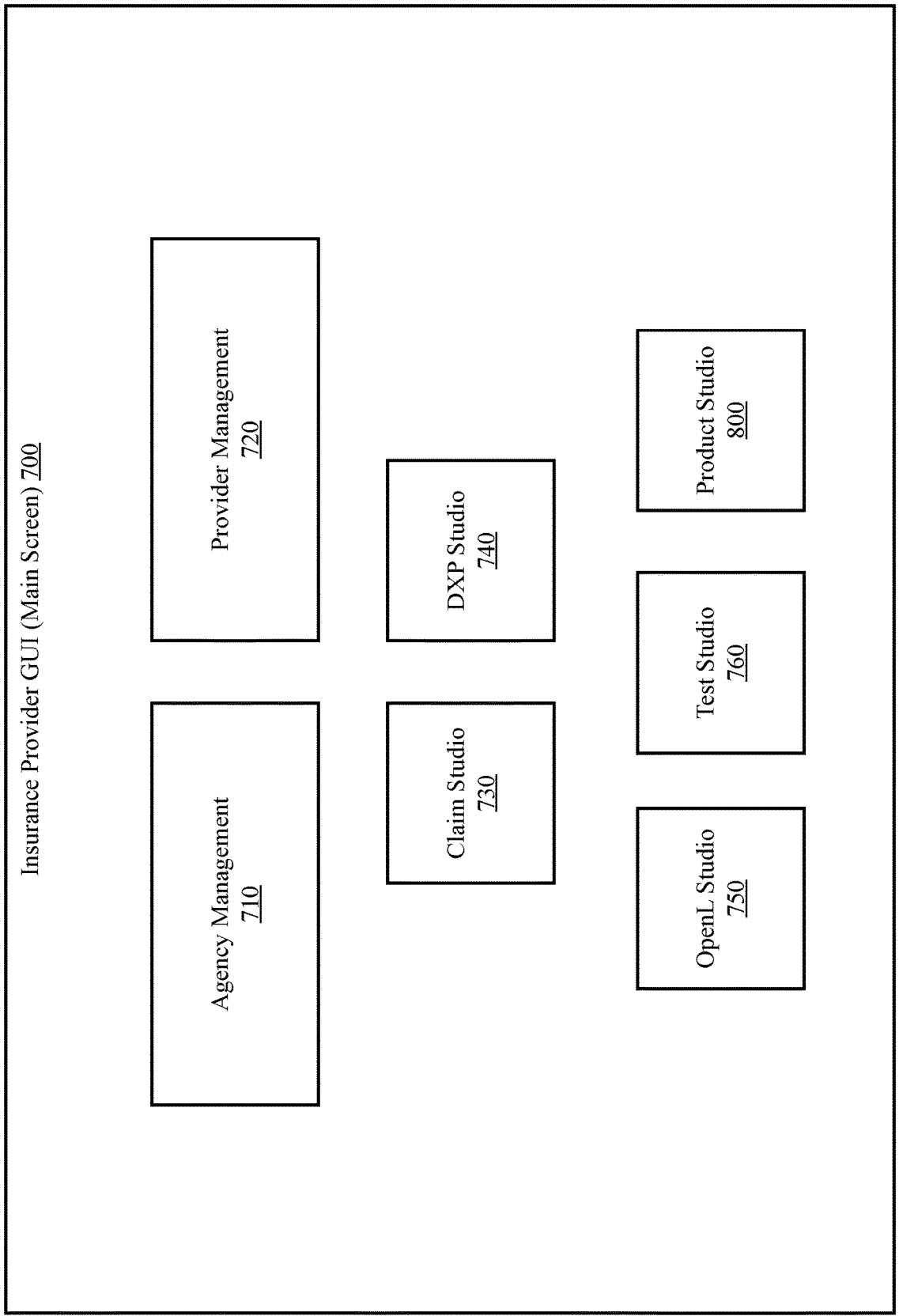
FIG. 7 is a block diagram showing an exemplary insurance provider graphical user interface (GUI) main screen.

FIG. 7 is a block diagram showing an exemplary insurance provider graphical user interface (GUI) main screen. The main screen 700 displays a plurality of buttons 710-760, 1400 each of which, when selected, invokes one of a series of configuration/management tools. Each of the tools may be implemented in any known manner. An Agency Management tool 710 and a Provider Management tool 720 allow definition and management of insurance agencies and insurance carriers, respectively. A Claim Studio tool 730 facilitates definition and management of claim types. A DXP Studio tool 740 allows definition and management of digital personas and API's for a DXP interface on a web browser or stand-alone application. An OpenL Studio tool 750 permits viewing and editing of business rules and rule products that have been created by a user. More specifically, OpenL Studio tool 750 permits configuration and/or management of rates, premium calculation, and configuration of underwriting questions. A Test Studio tool 760 facilitates testing of data management and products.

A Product Studio tool 800 allows policy product configurations and the default values for different attributes to be defined and/or managed for subsequent use by an agent/CSR. Product Studio tool 800 permits a carrier or other user to define attributes of one or more products to be offered by an agent/CSR to one or more customers. The tool allows the carrier or other user to define business rules for the product. The tool further allows the carrier or other user to define states of a policy issued under product, an entry state (e.g., an initial state), events/actions that cause a state transition, the different states that may be effectuated during a process of policy marketing and sale, such as a quote process (initiate quote, provide rate, etc.), and different states after a policy has been purchased (e.g., open policy, extend policy, cancel policy, etc.). The Product Studio tools also facilitates definitions of methods/functions that may be undertaken to specify/implement the product, as well as definition of options that are displayed/provided to the agent/CSR in the agent/CSR GUI and, where appropriate, default values for such options. Still further, the Product Studio tool allows the carrier or other user to specify which attributes are not displayed in the agent/CSR GUI.

Figure 8:
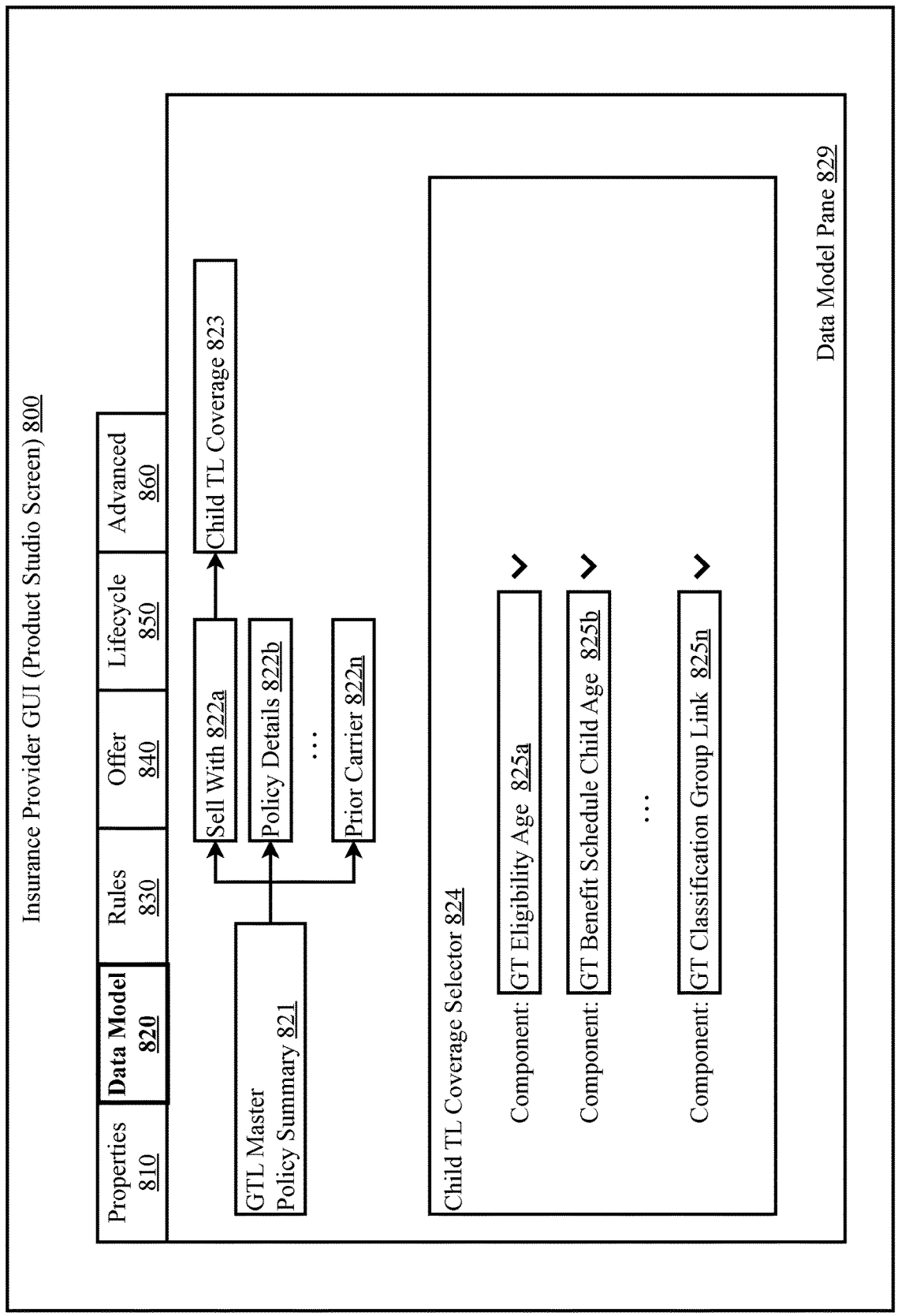
FIG. 8 is a block diagram showing an exemplary insurance provider graphical user interface (GUI) product studio screen.

FIG. 8 is a block diagram showing an exemplary insurance provider graphical user interface (GUI) product studio products screen. In the Product Studio tool 800 one or more new insurance products can be created and/or edited. The exemplary screenshot comprises several tabs which may be selected to edit different aspects of an insurance product, properties 810, data model 820, rules, 830, offer 840, lifecycle 850, and advanced 860.

Properties tab 810 displays various data that has been entered in associated fields (in the case of an already-defined product) or empty boxes in which data may be entered (in the case of a product that is being defined), such as Feature Name, Name, Short Name, a brief product description, the date on which the product will be made available to agents/CSR's for sale, the number of the product in a list of all or a subset of products, and the like.

In this example, data model tab 820 is selected and a data model window pane 829 is shown. Initial configuration and subsequent modification of the data model may be effected via the Data Model screen 829. Here, a simplified data tree containing model components 821, 822a-n, 823 is shown wherein the root of the tree shows a guaranteed term life (GTL) master policy summary 821, having policy components such as a sell with recommendation 822a, policy details 822b, prior carrier information 822n, etc., each of which may be expanded to show further detail such as the "sell with" recommendation that child term life (TL) coverage 823 may be sold with the GTL policy.

If child TL coverage 823 is selected, additional windows may be displayed such as the child TL coverage selector window 824 having a plurality of fields or dropdown menus for completion such as guaranteed term (GT) eligibility age 825a, GT benefit schedule child age 825b, GT classification group link 825n, etc.

Other features are not shown but may be included. Components may be added by selecting an "+Add Component" button. Modification functionality may be accessed by selecting any of the displayed boxes or by clicking on a component identified in a "Components Library" section of the screen. Thus, for example, clicking on the box labeled "Child TL Coverage" 823 causes display of child TL coverage selector 824, which allows editing/addition of settings, attributes. such as business rules and other rules (e.g., such as whether to display an attribute for modification or informational purposes to an agent/CSR, specification of one or more contract riders, etc.), and the like. The behavior of each attribute and the application of different rule types to each attribute may be specified. For example, rule types include visibility rules to hide the attribute, default behavior rules to add default values, or validation rules to validate a value, such as a premium or quote. Selecting the "+Add Attribute" button may allow various parameters in connection with a new attribute (including rules) to be defined. (Rules may be defined as described hereinafter). For example, clicking on a magnifying glass icon adjacent text "Search Rule" may display a screen showing defined and stored rules that may be specified for the new attribute.

Selection of the "Rules" tab 830, may display a rules entry screen which permits one or more rules/rule types to be defined for each attribute. On the other hand, if a button "Import" is selected one or more dialog boxes or screens (not shown) may be displayed allowing selection of one or more rules to import from an external source. If rules have already been defined, a rule may be selected by clicking on same. Clicking on a button "Create Rules Collection" may allow storage of selected sets of rules. Not only may rules and rule types be defined for a Model (in this illustrated example, GTL Master Policy Summary, but also whether one or more rules are to be executed on a particular action, for example, to specify that validation should be undertaken before calculating a premium or issuing a quote. Rule(s) may be specified as being executable when operating in a current state, on during a target state. A "Dimensions" field may facilitate set up of attributes in the system as dimension attribute(s) (for example, State) and then aggregate rules based on the dimension. For example, one can have a state attribute as a dimension and specify that some rules are applicable only for specific state.

Clicking on the tab "Offer" 840 may cause an Offer to be displayed. The "Offer" and subsequent screens permit configuration of a default product that may be modified (within limits) by an agent/CSR. Dropdown boxes may be available for "Face Amount," "Payment Duration," "Death Benefit Option," (if such an option may be selected as part of the relevant product and, if, what options are to be made available), "Payment Frequency," (e.g., yearly, semiannually, quarterly), applicable type of DOLI test, a "Change Frequency (for Death Benefit Option)," which is specific for a Universal life product (this allows a specification of how frequently a user can change a death benefit option from option A to option B, or vice versa), and "Non-Forfeiture Default Option" (i.e., to specify what effect non-payment of premiums will have on a policy issued in accordance with the product). A user-selectable switch may be included to indicate whether the product will offer the ability to withdraw funds from the cash value as a loan to cover unpaid premiums. A dropdown box may be included for selection of "Whole Life" under a title "Permanent Life." Previously-defined whole life products are identified in a list below the "Whole Life" dropdown box when the downward arrow of the dropdown box is selected. One of the thus-displayed products can then be selected, either by hovering over or clicking on the displayed product, at which time the product is identified by a vertical stripe and changing of a background color or otherwise indicated (such as by highlighting) and one or more boxes labeled with coverage options (and/or other attributes) that may be included in the product as defined are displayed in boxes together with trash can icons. A "Waiver of Premium" box indicating that the selected product may be configured to include a waiver of premium rider. An "Add Coverage" button may display a series of coverage options that may be selected for inclusion, for example, by rider, in the selected product. Selection of one or more coverage options causes such option(s) to be displayed below the selected product (e.g., below the "Waiver of Premium" box). Clicking on a trash can icon, on the other hand, deletes a coverage option, whereupon the associated box is deleted below the associated product. Addition or deletion of coverage option(s) causes the system to recalculate parameters for the product including an offer for the product. Functionality is provided for the configuration of different plan types and ability to select on the GUI different plans for different companies.

Selecting the "Lifecycle" tab 850, may show the various states (which may be viewable/selectable by selecting a tab "State Machine States") and transitions between states (which may be viewable/selectable by selecting a tab "State Machine Transitions" for each product from the process of quoting, issuance of a policy, and cancellation/modification/reinstatement of the policy can be viewed, defined, and/or edited.

Selecting the "Advanced" tab 860 may bring up a screen which permits advanced settings and functions to be defined and/or set.

Figure 9:
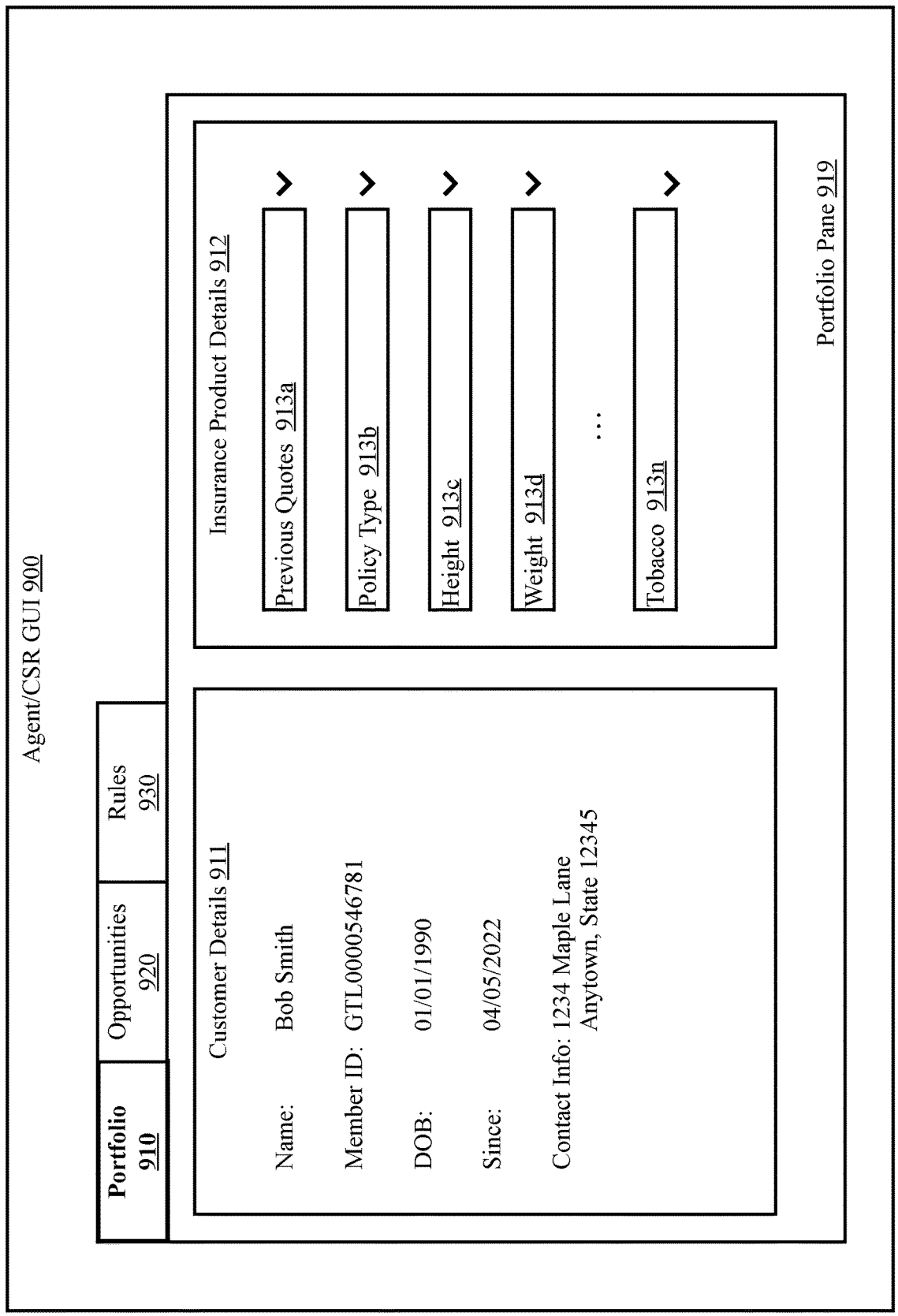
FIG. 9 is a block diagram showing an exemplary agent/customer service representative (CSR) graphical user interface (GUI) screen.

FIG. 9 is a block diagram showing an exemplary agent/customer service representative (CSR) graphical user interface (GUI) screen. After insurance product setup, agents/customer service representatives (CSR) may be provide with an agent/CSR GUI 900 for entry of customer details, obtaining of quotes, and making offers for sale of insurance products to customers. Agent/CSR GUI 900 of this example shows tabs comprising portfolio 910, opportunities 920, and rules 930. Here, the portfolio tab 910 is shown as being selected, which displays a portfolio pane 919 for review of, and entry of, information.

Portfolio pane 919 of this example comprises windows for customer details 911 and insurance product details 912. Customer details 911 window lists pre-populated known information for an existing or previous customer, which may be changed by clicking on the relevant field. Insurance product details 912 window shows dropdown menus containing known information about current and previous insurance policies for the customer shown in customer details 911 window. Dropdown menus in this example comprise previous quotes 913a provided to this customer, policy type 913b for which a quote is requested, and relevant information depending on policy type such as customer height 913c, customer weight 913d, and whether or not the customer uses tobacco products 913n.

Opportunities tab 920 will show similar information and dropdown menus for the agent to identify sales opportunities with this customer. Rules tab 930 will show similar information and dropdown menus for the agent to define rules for interactions with or sales to this customer.

Figure 10:
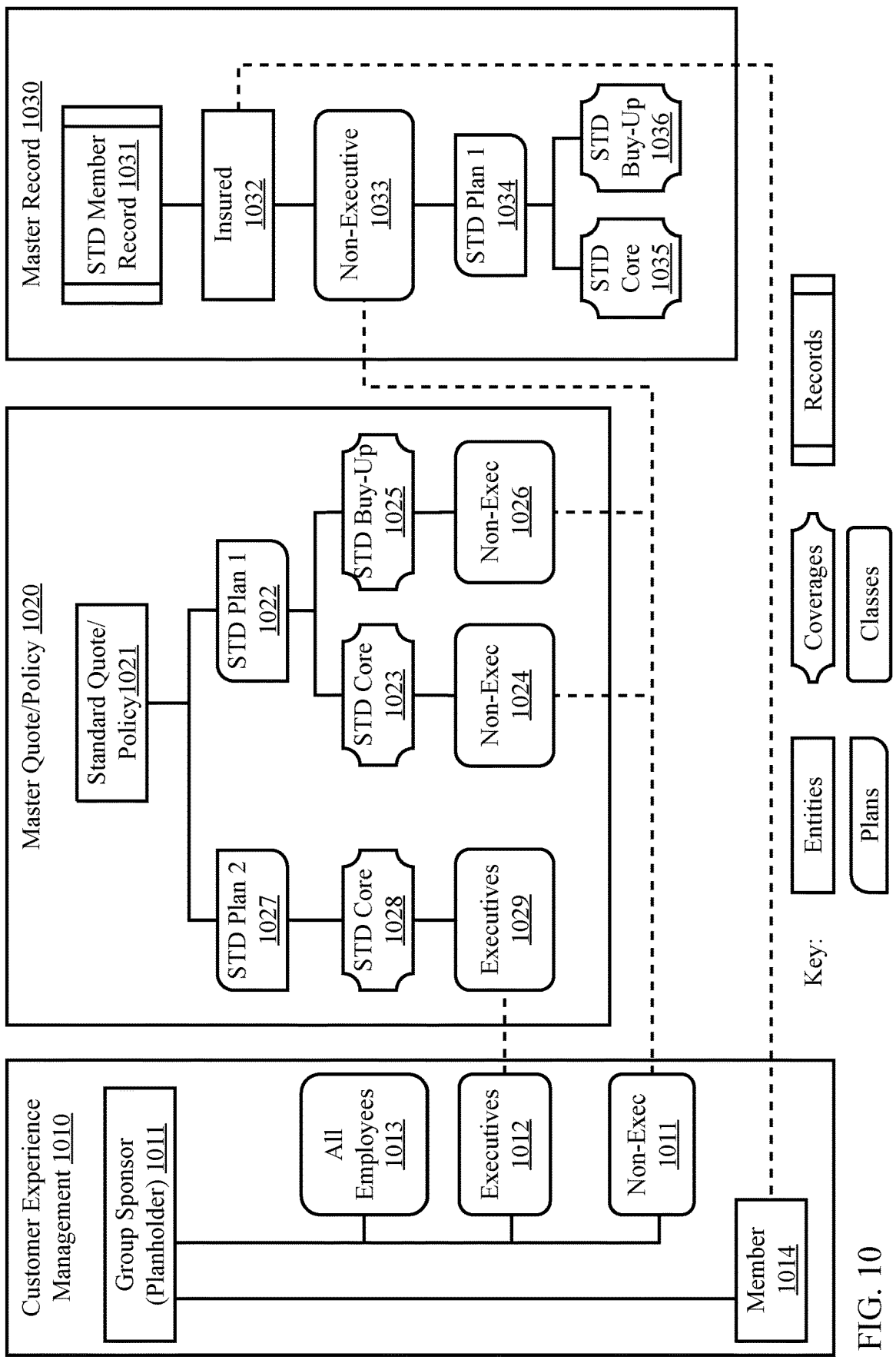
FIG. 10 is a relational diagram showing exemplary relationships between a customer experience management module, a master quote/policy module, and a member record module.

FIG. 10 is a relational diagram showing exemplary relationships between a customer experience management module, a master quote/policy module, and a member record module. Here, data relationships are shown between a customer experience management (CEM) portal 1010, a master quote/policy module 1020, and a master record 1030. The various components or factors in the diagram are shown as entities involved, overall insurance plans, coverage terms and conditions (coverages) for each plan, classes of coverage (in this example, a group policy is shown having two classes: executive employees and non-executive employees), and data records.

CEM portal 1010 is used by brokers, agents, and salespersons to manage customer accounts. The group sponsor (the planholder, usually an employer) is shown as the primary entity selected, with links to data for all employees 1013, executive employees only 1012, and non-executive employees 1011. Member entity 1014 may be the same as the group sponsor (e.g., for small companies) or may be a subsidiary or affiliate of group sponsor 1011. Dashed lines show relationships between related data in the other modules such as the relationship between executives 1012 in CEM 1010 and executives 1029 in master quote/policy module 1020, between non-executives 1011 in CEM 1010 and non-executives 1024, 1026 in master quote/policy module 1020, between non-executives 1011 in CEM 1010 and non-executives 1033 in master data record 1030, and between member 1014 in CEM 1014 and insured 1032 in master record 1030. In this way, data consistency is maintained across modules and/or portals of platform 100.

Master quote/policy module 1020 provides the structure and terms and conditions for policies, starting with a high-level standard quote/policy 1021 containing overall rules and policies for the type of insurance product under consideration, which may be divided into different standard insurance plans 1022, 1027 for different circumstances or situations rules and standards for policies. Each standard plan 1022, 1027 may have associated with it a set of core terms and conditions 1023, 1025, 1028, which may apply to certain classes of insureds 1024, 1026, 1029. In this example, there are two standard plans, a standard plan 1 1022 for non-executive employees 1024, 1026, and a standard plan 2 1027 for executive employees 1029. Standard plan 1 1022 comprises standard core terms 1023, plus a standard "buy up" offering 1025 which allows non-executive employees 1024, 1026 to expand their coverage for an additional fee. Standard plan 2 1027 comprises standard core terms 1028 which may already include at no additional cost the terms of standard "buy up" 1025 which is an extra cost to non-executive employees.

Master record 1030 stores a permanent record of issued policies, and contains records which correspond to the various components of CEM module 1010 and master quote/policy module 1020. In this example, a standard member record 1031 contains data records for an insured 1032, who in this case is the member 1014 of CEM 1010, records for a specific non-executive employee 1033 who is an insured employee under the group policy of insured 1032, and records indicating that non-executive employee is insured under standard plan 1 1034 with both standard core terms 1035 and standard buy up terms 1036.

Figure 11:
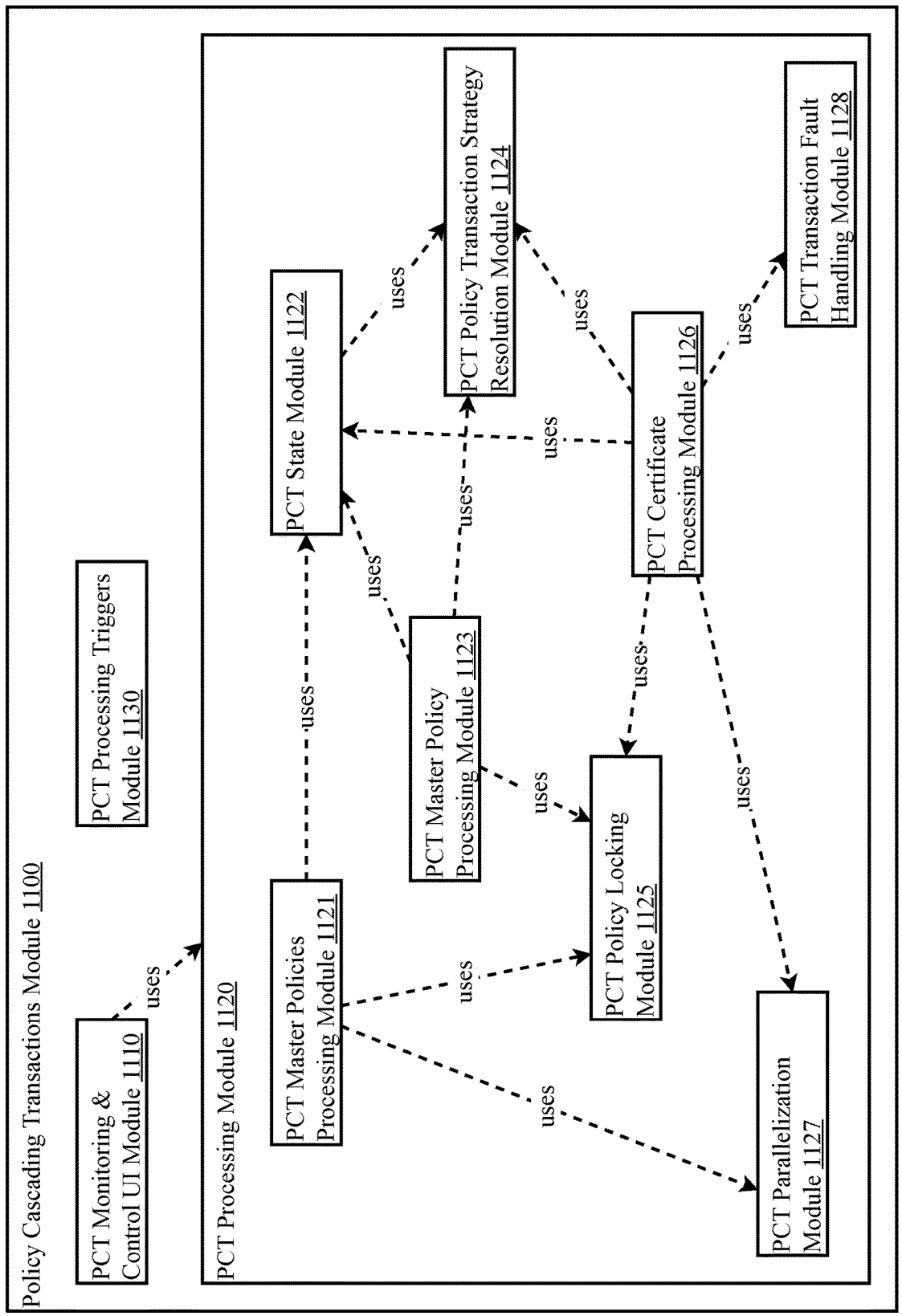
FIG. 11 is a relational diagram showing exemplary relationships within a policy cascading transactions module.

FIG. 11 is a relational diagram showing exemplary relationships within a policy cascading transactions module. This relational diagram explains how relationships between microservices may be structured to provide underwriting and policy management. The example shown in this diagram is of a policy cascading transaction (PCT) module whose function is to cascade any changes to a master policy contract down to all instances of policies that are dependent on that master policy contract. Policy cascading transaction (PCT) module 1100 comprises a PCT monitoring & control user interface (UI) module 1110, a PCT processing module 1120, and a PCT processing triggers module 1130, each of which may be a microservice or collection of microservices.

PCT monitoring & control user interface (UI) module 1110 provides a user interface for monitoring and control of the functionality of PCT processing module 1120. PCT monitoring & control user interface (UI) module 1110 displays any events that occur that trip one or more triggers established in PCT processing triggers module 1130, some non-limiting examples of which include passing of expiration or coverage dates, receipt of claims against a policy, requests for quotations, and changes to the status of employees insured under a policy.

PCT processing module 1120 performs the propagation (cascading) of changes from the master policy contract to all dependent policies. Changes to the master policy are received at PCT master policies processing module 1121 which uses a PCT state module 1122 to track the state (status) of each dependent policy (for example, determining when the policy expires so that the changed terms can be applied), a PCT policy locking module 1125 to prevent any other changes from occurring to each dependent until the changes to the master policy can be implemented, and a PCT parallelization module 1127, which allows for policy changes to all dependent policies to be made in parallel as opposed to in series. An instance of a PCT master policy processing module 1123 may be generated for each dependent policy to be changed, which manages the process of implementing the master policy changes on that dependent policy using PCT state module 1122, the PCT policy locking module 1125, and a PCT policy transaction strategy resolution module which may act as a scheduler for the timing of implementation. After the changes have been made, policy certificates may be issued by a PCT certificate processing module which uses the modules described above plus a PCT transaction fault handling module 1128 which notifies an administrative user if the changes failed to implement or if other errors occur during processing.

Exemplary Computing Environment

Figure 12:
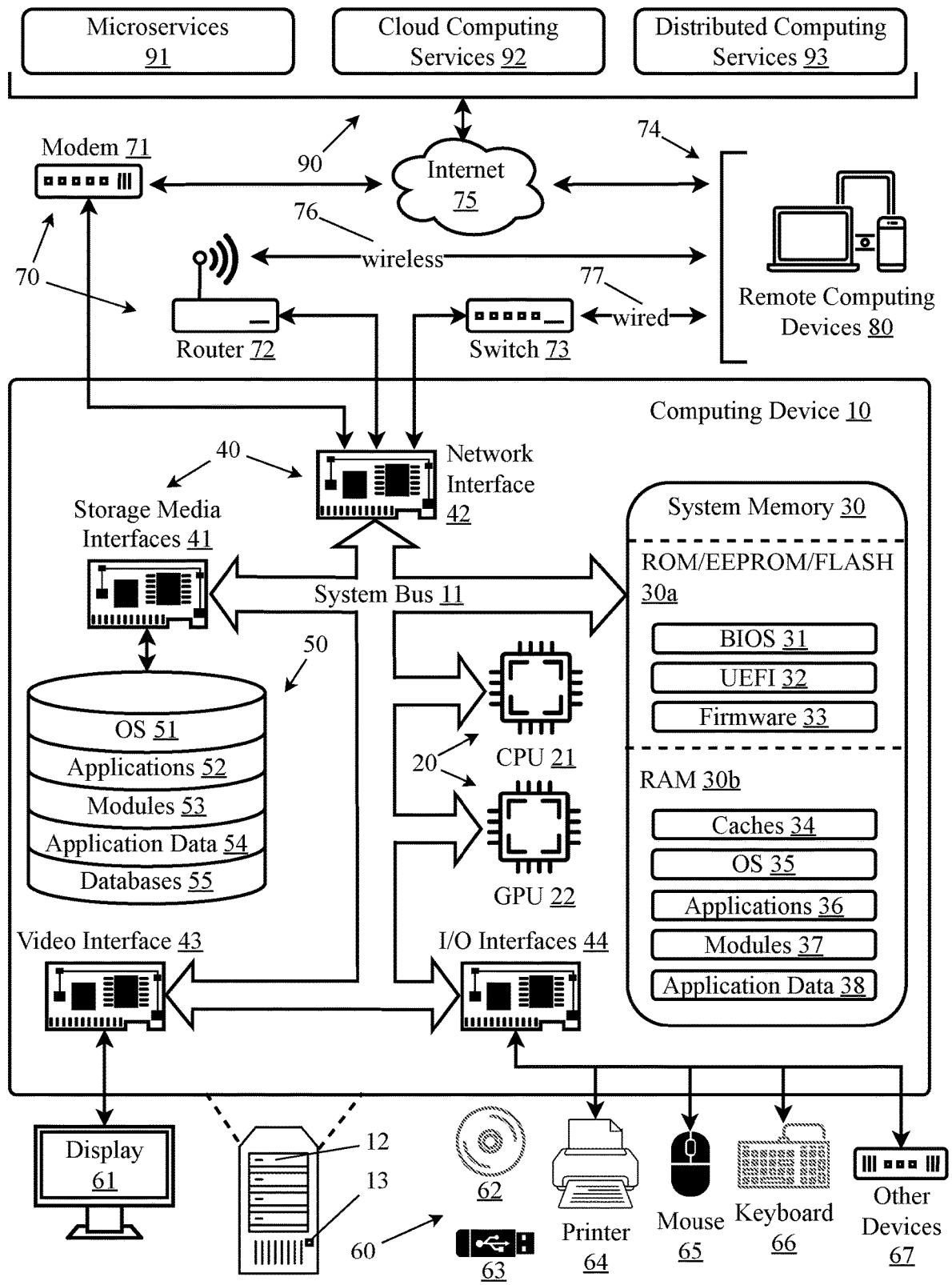
FIG. 12 illustrates an exemplary computing environment on which an embodiment described herein may be implemented.

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A cloud-based system for insurance product management, comprising:
   a computing device comprising a memory, a processor, and a non-volatile data storage device;
   an insurance product template database stored on the non-volatile data storage device, the product template database comprising definitions for a plurality of pre-defined life insurance products;
   an external system interface operating on the computing device comprising a plurality of application programming interfaces (APIs) which provide access to the functionality of a plurality of foundational microservices via API calls and to a plurality of product-specific microservices via API calls;
   the plurality of foundational microservices accessible via the APIs of external system interface each of which implements functionality common to all of a plurality of insurance products supported by the cloud-based system;
   the plurality of product-specific microservices accessible via the APIs of external system interface wherein each product-specific microservice implements product specific capabilities for one or more of the plurality of pre-defined life insurance products; and
   a product factory module for defining new life insurance products based on the plurality of templates stored in the product template database, the definitions of which automatically assign a first set of foundational microservices of the plurality of foundational microservices and a first set of product-specific microservices of the plurality of product-specific microservices to each newly-defined life insurance product; and
   a conversion model comprising a plurality of conversion microservices configured to transpose terms and conditions of group insurance policies terms onto equivalent terms of individual insurance policies and vice-versa, wherein a change made to the master policy is propagated to both dependent group insurance policies of the pre-defined life insurance products and dependent individual insurance policies of the pre-defined life insurance products by passing the changes through the conversion model;
   wherein when a first life insurance product is defined using the product factory, management and administration of the first life insurance policy is automated by receipt of API calls via external system interface to the first set of foundational microservices and the first set of product-specific microservices;
   wherein:
      the insurance product template database further comprises a master policy comprising terms and conditions to be applied to a plurality of the pre-defined life insurance products; and
      the cloud-based system further comprises a policy cascading transactions module comprised of a plurality of cascading transaction microservices, wherein the policy cascading transactions module is configured to cascade any changes to the master policy to any of the pre-defined life insurance products which are dependent on the master policy.

2. The system of claim 1, wherein the plurality of foundational microservices implement functionality common to the plurality of insurance products which includes term life insurance products and permanent life insurance products.

3. The system of claim 2, wherein the plurality of product-specific microservices implements product specific capabilities for permanent life insurance products comprising whole life insurance and universal life insurance.

* * * * *